United States Patent
Durvasula et al.

(10) Patent No.: US 11,449,887 B2
(45) Date of Patent: Sep. 20, 2022

(54) SYSTEMS AND METHODS FOR LOYALTY POINT DISTRIBUTION

(71) Applicant: American Express Travel Related Services Company, Inc., New York, NY (US)

(72) Inventors: Sastry Durvasula, Phoenix, AZ (US); Andras Ferenczi, Peoria, AZ (US); Harish Naik, Phoenix, AZ (US); Vishnuvajhala Subrahmanyam, Phoenix, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 252 days.

(21) Appl. No.: 15/728,086

(22) Filed: Oct. 9, 2017

(65) Prior Publication Data
US 2019/0108542 A1 Apr. 11, 2019

(51) Int. Cl.
*G06Q 30/02* (2012.01)
*G06Q 20/36* (2012.01)
(Continued)

(52) U.S. Cl.
CPC ......... *G06Q 30/0226* (2013.01); *G06Q 20/36* (2013.01); *G06Q 20/3829* (2013.01);
(Continued)

(58) Field of Classification Search
None
See application file for complete search history.

(56) References Cited

U.S. PATENT DOCUMENTS 7,467,096 B2* 12/2008 Antonucci ............. G06Q 30/02
705/14.27
9,785,912 B2 10/2017 Quezada
(Continued)

FOREIGN PATENT DOCUMENTS

CN 107070644 8/2017
CN 107079036 8/2017
(Continued)

OTHER PUBLICATIONS

Da Costa, Sergio Manuel Rodrigues, "Implementing a Loyalty Card for Smartphones Using a Bitcoin Like Approach", PQDT—Global ProQuest Dissertations Publishing. (2014) (Year: 2014).*
(Continued)

*Primary Examiner* — Neha Patel
*Assistant Examiner* — Clay C Lee
(74) *Attorney, Agent, or Firm* — Thomas | Horstemeyer, LLP

(57) ABSTRACT

A blockchain-based loyalty point system may include a blockchain API host that receives a request to transfer an amount of loyalty points from a first customer account to a second customer account. The system may validate the request by performing a cryptographic operation on the request using a public key associated with the first customer account. The system may also propagate a proposal to consensus participants for writing to a blockchain, wherein the proposal comprises the first customer account, the second customer account, and the amount of loyalty points. The system may also receive an exchange request from a loyalty wallet associated with the second customer account, validate the exchange request by performing the cryptographic operation on the exchange request using a public key, and propagate an exchange proposal to the consensus participants for writing to the blockchain.

20 Claims, 9 Drawing Sheets

(51) Int. Cl.
*G06Q 20/38* (2012.01)
*H04L 9/14* (2006.01)
*H04L 9/32* (2006.01)
*H04L 9/40* (2022.01)
*H04L 9/00* (2022.01)

(52) U.S. Cl.
CPC .............. *H04L 9/14* (2013.01); *H04L 9/3239* (2013.01); *H04L 9/3247* (2013.01); *H04L 9/3297* (2013.01); *G06Q 2220/00* (2013.01); *H04L 9/50* (2022.05); *H04L 63/0428* (2013.01); *H04L 2209/56* (2013.01)

(56) References Cited

U.S. PATENT DOCUMENTS

| | | | |
|---|---|---|---|
| 2002/0178354 A1* | 11/2002 | Ogg | G06Q 20/401 705/62 |
| 2003/0014373 A1 | 1/2003 | Perge et al. | |
| 2003/0200144 A1 | 10/2003 | Antonucci et al. | |
| 2014/0108263 A1 | 4/2014 | Ortiz et al. | |
| 2016/0283941 A1 | 9/2016 | Andrade | |
| 2016/0292672 A1 | 10/2016 | Fay et al. | |
| 2016/0342977 A1 | 11/2016 | Lam | |
| 2016/0379213 A1* | 12/2016 | Isaacson | G06Q 20/3678 705/44 |
| 2017/0017936 A1 | 1/2017 | Bisikalo et al. | |
| 2017/0140408 A1* | 5/2017 | Wuehler | G06Q 30/0207 |
| 2017/0169248 A1* | 6/2017 | Darcy | G06Q 30/0207 |
| 2017/0186057 A1* | 6/2017 | Metnick | G06Q 20/02 |
| 2017/0232300 A1 | 8/2017 | Tran et al. | |
| 2017/0236143 A1* | 8/2017 | Code | G06Q 20/387 705/14.27 |
| 2017/0243239 A1* | 8/2017 | El-Eid | G06Q 30/0208 |
| 2017/0279774 A1 | 9/2017 | Booz et al. | |
| 2017/0286951 A1 | 10/2017 | Ignatchenko et al. | |
| 2018/0025442 A1 | 1/2018 | Isaacson et al. | |
| 2018/0064645 A1 | 3/2018 | Greenspoon | |
| 2018/0089645 A1 | 3/2018 | McDonald et al. | |
| 2018/0293573 A1 | 10/2018 | Ortiz et al. | |
| 2018/0349891 A1 | 12/2018 | Putre et al. | |
| 2019/0180311 A1 | 6/2019 | Chan et al. | |
| 2019/0312877 A1 | 10/2019 | Xie et al. | |
| 2021/0279762 A1* | 9/2021 | Eklund | G06Q 30/0226 |

FOREIGN PATENT DOCUMENTS

| | | | | |
|---|---|---|---|---|
| EP | 3454238 | 6/2018 | | |
| KR | 10-1591244 B1 | 2/2016 | | |
| KR | 10-2016-0050876 A | 5/2016 | | |
| KR | 10-2016-0095720 A | 8/2016 | | |
| KR | 10-2016-0114749 A | 10/2016 | | |
| KR | 10-2016-0132307 A | 11/2016 | | |
| WO | WO-2017069874 A1 * | 4/2017 | ......... | G06Q 20/3829 |
| WO | 2017/136956 | 8/2017 | | |
| WO | 20170136956 | 8/2017 | | |
| WO | WO-2017136956 A1 * | 8/2017 | ............. | G06F 16/27 |
| WO | 2018064645 | 4/2018 | | |

OTHER PUBLICATIONS

International Search Report and Written Opinion dated PCT/US2018/047640.

Vasudevan Swamidurai, U.S. Appl. No. 15/948,834, filed Apr. 9, 2018, titled "Reward Point Transfers Using Blockchain".

Vasudevan Swamidurai, U.S. Appl. No. 15/956,982, filed Apr. 19, 2018, titled "Reward Point Redemption for Cryptocurrency".

International Search Report and Written Opinion dated Jun. 13, 2019 in No. PCT/US2019/022798.

International Search Report and Written Opinion dated Jun. 28, 2019 in No. PCT/US2019/26818.

International Search Report and Written Opinion dated Apr. 24, 2020 for PCT Patent Application No. PCT/ US2020/017350.

Sweeney E. (2018) "AmEx Pilots Blockchain-Based Loyalty Rewards with Boxed" Marketingdive Retrieved on Jan. 31, 2020. <https://www.marketingdive.com/news/amex-pilots-blockchain-based-loyalty-rewards-with-boxed/524452/>.

* cited by examiner

SYSTEMS AND METHODS FOR LOYALTY POINT DISTRIBUTION

FIELD

This disclosure generally relates to loyalty points, and more particularly, to systems and methods for loyalty point distribution using a distributed database based on purchases.

BACKGROUND

Payment networks typically implement various systems for processing transactions between merchants and customers. Merchants are members of the payment network and the merchants are authorized to charge to customer accounts. Customers have a transaction account with the payment network. To complete a transaction, a merchant typically transmits a payment request (or settlement) to the payment network with transaction details and the card member's account information. For payment networks using loyalty points, options for using points are often limited to a few merchants.

Payment networks typically face increased costs and limitations associated with the traditional payment model. The payment network implements secure protocols for handling the payment requests, and such secure protocols along with network infrastructure are costly to develop and maintain. The high network costs also result in high fees charged to merchants using the payment network. Additional programs supported by a payment network such as loyalty points, for example, further increase costs associated with security and infrastructure.

SUMMARY

A system, method, and computer readable medium (collectively, the "system") is disclosed for operating a payment network based on loyalty points. The system may include a blockchain API host that receives a request to transfer an amount of loyalty points from a first customer account to a second customer account. In addition to loyalty point transfers, the blockchain-based system may award loyalty points to customers in response to spending, redeem loyalty points for goods and services, exchange of loyalty points into fiat currency, and execute other loyalty point transactions. The system may validate a request by performing a cryptographic operation on the request using a public key associated with the first customer account. The system may also propagate a proposal to consensus participants for writing to a blockchain, wherein the proposal comprises the first customer account, the second customer account, and the amount of loyalty points.

In various embodiments, a loyalty wallet may run on a computing device and transmit the request to the blockchain API host using an API call. The consensus participants may achieve consensus on the proposal using at least one of proof of work, proof of stake, practical byzantine fault tolerance, or delegated proof of stake, or any suitable consensus algorithm. The system may also perform operations including receiving a registration request for a customer account comprising the public key, validating the registration request by performing the cryptographic operation on at least a portion of the registration request using the public key, and propagating, by the blockchain API host, a registration proposal to the consensus participants for writing to the blockchain. The loyalty wallet may encrypt and/or store a private key corresponding to the public key.

In various embodiments, the system may also receive a registration request for a loyalty partner site, validate the registration request by performing the cryptographic operation on at least a portion of the registration request using a public key associated with the loyalty partner site, and propagate a registration proposal to the consensus participants for writing to the blockchain. The system may also receive a payment request from a loyalty wallet associated, validate the payment request by performing the cryptographic operation on the payment request, and propagate a payment proposal to the consensus participants for writing to the blockchain. The payment proposal may include the merchant account, the payment amount, and a customer account. The system may also receive an exchange request from a loyalty wallet associated with the second customer account, validate the exchange request by performing the cryptographic operation on the exchange request using a public key, and propagate an exchange proposal to the consensus participants for writing to the blockchain.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
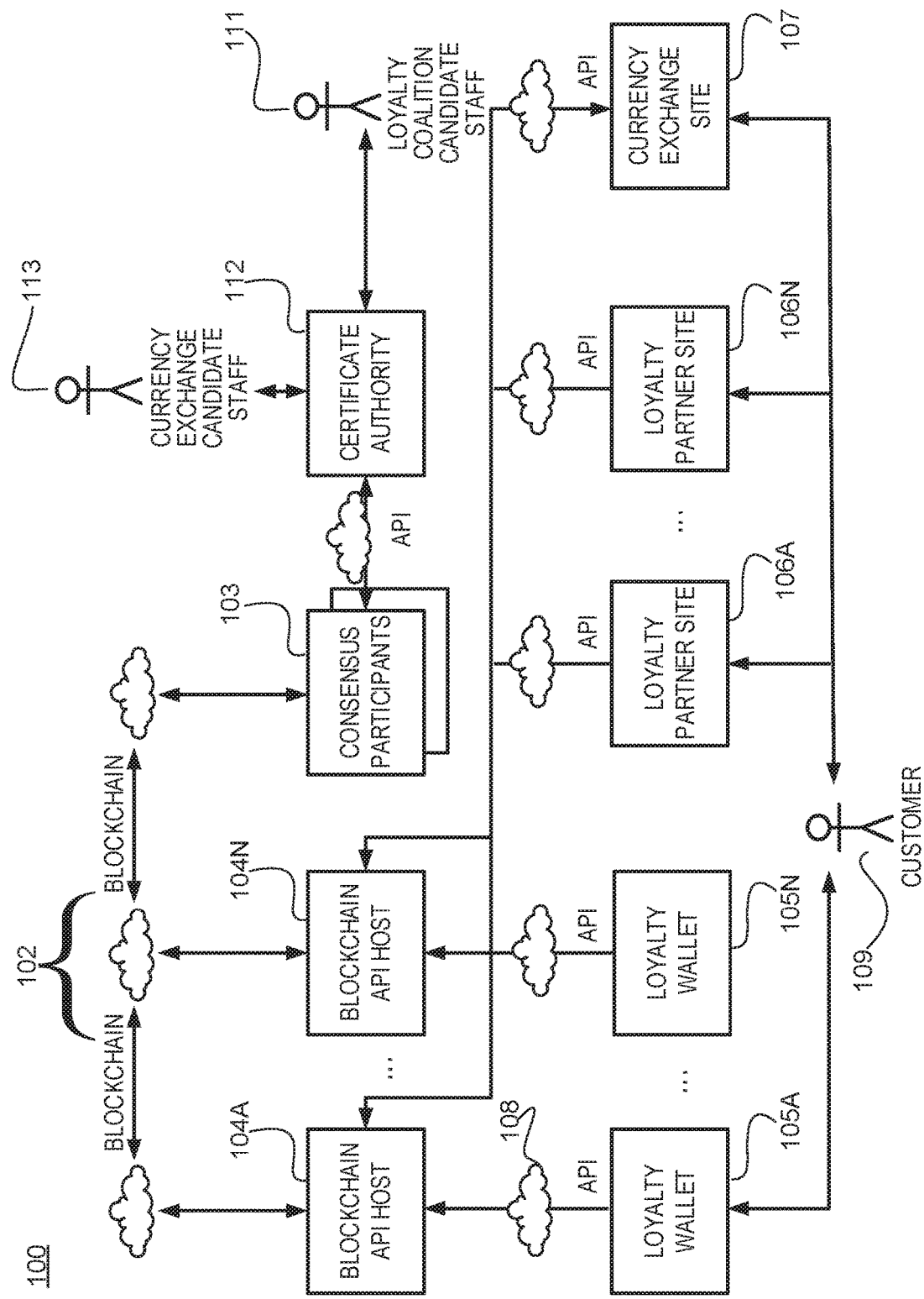
FIG. 1 illustrates a loyalty point or digital currency system configured to operate on a public, private, or semi-private leger maintained on a blockchain, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A payment network based on peer-to-peer payments may be used to facilitate most functions of traditional card payment networks and to enable additional services and functionality. For example, a blockchain driven peer-to-peer payment network enables near-instant transaction authorization and settlement. Payment, authorization, and/or settlement on such a network may result in money changing hands in an hour, 10 minutes, a minute, or less depending on the infrastructure used to implement the payment network. For a blockchain-based peer-to-peer payment network, a governing organization or consortium may control access to bank transfer services. Anyone can participate in the payment network, but in various embodiments, only users that registered with the managing organization(s) may transfer earned credits into fiat currency via wire transfers to bank accounts. The blockchain may autonomously manage workflows associated with payment processing as described in greater herein.

The payment networks use a distributed ledger, which may be based on a blockchain, and the payment networks have consensus-based transaction validation. Such payment networks may also enable digital currency smart contracts that enforce business workflows in a decentralized manner and keep track of account balances. The payment networks may also enable reputation based smart contracts that act as a directory of trustworthy entities as part of the network. A digital currency issuer may be included in the payment network and may be configured to transfer balances between external banks and digital currency based wallets vie electronic funds transfer (EFT) systems. The digital currency issuer may also connect customers with lenders to convert lines of credit into digital currencies. The payment network may also include digital wallet services deployed on user devices such as, for example, computers, tablets, smartphones, Internet of Things devices (IoT devices), etc. The digital wallet may enable payments by interacting with the smart contracts and the blockchain underpinning the payment network.

FIG. 1 depicts a loyalty point network 100 that operates on a blockchain 102, in accordance with various embodiments. Blockchain 102 may be a distributed database that maintains records in a readable manner and that is resistant to tampering. The blockchain may comprise a system of blocks containing data that are interconnected by reference to the previous block. The blocks can hold file transfer data, smart contract data, and/or other information as desired. Each block may link to the previous block and may include a timestamp. When implemented in support of a loyalty payment network 100, the blockchain may serve as an immutable log for loyalty point transactions and registrations. The blockchain may be a peer-to-peer network that is private, consortium and/or public in nature (e.g., Ethereum, Bitcoin, etc.). Consortium and private networks may offer improved control over the content of the blockchain and public networks may leverage the cumulative computing power of the network to improve security. In that regard, blockchain 102 may be implemented using technologies such as, for example, Ethereum GETH, eth-lightwallet, or other suitable or future blockchain interface technologies.

In various embodiments, blockchain 102 may be maintained by consensus participants 103 in the form of computing devices configured to validate blocks of the blockchain. Loyalty point network 100 comprises a plurality of blockchain API hosts 104 that communicate with blockchain 102 in response to receiving API calls from various other computing devices and systems seeking to read from or write to blockchain 102. Blockchain API hosts 104 and other computing devices described herein may take the form of a computer or processor, or a set of computers/processors, although other types of computing units or systems may be used. Exemplary computing devices include servers, pooled servers, laptops, notebooks, hand held computers, personal digital assistants, cellular phones, smart phones (e.g., iPhone®, BlackBerry®, Android®, etc.) tablets, wearables (e.g., smart watches and smart glasses), Internet of things (IOT) devices or any other device capable of receiving data over network. Each computing device may run applications to interact with blockchain 110, communicate with other devices, perform crypto operations, and otherwise operate within loyalty point network 100. Computing devices may run a client application that can be a thin client (web) based, hybrid (i.e. web and native, such as iOS and Android), or native application to make API calls to blockchain API host 104 and interact with blockchain 102.

In various embodiments, blockchain API hosts 104 may host an outward facing API 108 accessible by communication over a network such as, for example, a LAN, a WAN, and/or the Internet. As used herein, the term "network" includes any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available (e.g., Twofish, RSA, El Gamal, Schorr signature, DSA, PGP, PKI, GnuPG, and other symmetric or asymmetric cryptosystems). Asymmetric encryption in particular may be of use in signing and verifying signatures for blockchain crypto operations.

In various embodiments, API 108 may serve as a blockchain interface accessible by applications and computing devices of loyalty point network 100. API 108 may be implemented using technologies such as, for example, Ethereum GETH, eth-lightwallet, or other suitable blockchain interface technologies. Loyalty wallets 105 may communicate with blockchain API host 104 using API 108. Loyalty wallet 105 may check loyalty point balances, adjust loyalty point balances, transfer loyalty points, register a user or device, or otherwise manipulate loyalty points as allowed by loyalty point network 100. Loyalty wallet 105A, for example, may run on a mobile device to enable customer 109 to interact with blockchain 102 and his or her loyalty points.

In various embodiments, merchants that accept loyalty points from loyalty point network 100 as a form of payment may host loyalty partner sites 106 on computing devices. Customer 109 may browse or search loyalty partner site 106 for items in a manner similar to typical ecommerce sites. Once customer 109 has selected items for purchase, customer 109 may purchase the items using loyalty points. Loyalty partner sites 106 may thus communicate with blockchain 102 through blockchain API host 104 using API 108 to complete purchase transactions using loyalty points.

In various embodiments, currency exchange sites 107 may exchange loyalty points from customer 109 into fiat currency. Currency exchange sites may include web sites hosted on computing devices remote from customer 109 and/or brick and mortar locations such as currency exchange stores. Currency exchange sites 107 may communicate with blockchain 102 through blockchain API host 104 using API 108.

In various embodiments, loyalty point network 100 may include controls to restrict access to registered loyalty partner sites 106 and/or currency exchange sites 107. Certificate authority 112 may allow participants to join loyalty point network 100 or may disallow would-be participants from joining loyalty point network 100. Certificate authority may communicate with blockchain 102 through consensus participants 103 of blockchain 102 using an API 108. Certificate authority 112 may include a web interface for review of new currency exchange sites by currency exchange candidate staff 113. Similarly, certificate authority 112 may include a web interface for review of new loyalty partner sites by loyalty coalition candidate staff 111. The staff members may thus approve or deny candidates for joining loyalty point network 100. Validation may include verifying of proof of identity such as, for example, phone number, employer id, SSN, or any sensitive information that known by the employees of the respective entity.

Figure 2:
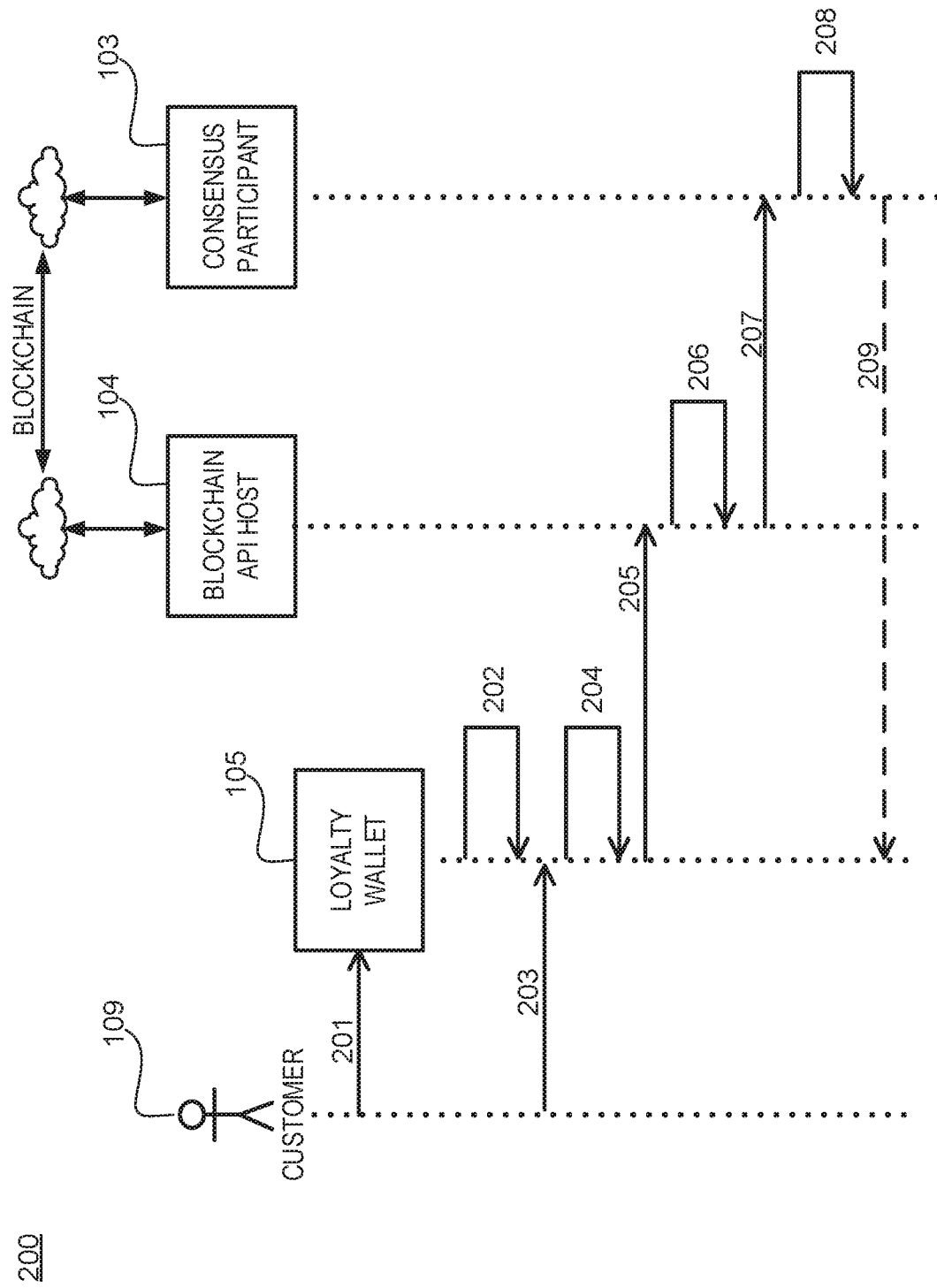
FIG. 2 illustrates a process for registering users for a payment network for loyalty points using a blockchain-based leger, in accordance with various embodiments.

Referring to FIG. 2, an exemplary registration process 200 is shown for loyalty point network 100, in accordance with various embodiments. Customer 109 may download and install a loyalty wallet 105 on his or her mobile device (Step 201). Loyalty wallet 105 may be in electronic communication with blockchain API host 104 over a network. Loyalty wallet 105 may generate and/or receive an asymmetric cryptography key pair including a private key paired with a public key (Step 202). Loyalty wallet 105 may display a mnemonic seed and password selection screen to customer 109, and it may use BIP32, BIP39, BIP44, or another key generation technique to create public keys (e.g., blockchain addresses) and private keys, which may be encrypted and stored locally on the customer's computing device.

In various embodiments, loyalty wallet 105 may encrypt the private key and securely store the private key for later use. Loyalty wallet 105 may also collect personal information from customer 109 (Step 203). A registration form may, for example, include fields for customer 109 to enter a user name and enter a password. Customer 109 may enter user credentials comprising a user ID, password, and any other information entered into the registration form of loyalty wallet 105.

In various embodiments, loyalty wallet 105 may prepare and sign a registration request for transmission to a blockchain API host 104 (Step 204). The registration request may include the personal information of customer 109 (collected in step 203), the public key (generated in step 202), an application ID, a device ID, an account number, or other information germane to registration. In that regard, the blockchain address may be associated with the customer's loyalty point account. The signature may be a crypto operation performed with the private key from the asymmetric key pair (generated in step 202). Loyalty wallet 105 may transmit the registration request to blockchain API host 104 (Step 205). Loyalty wallet 105 may make an API call to transmit the registration request.

In various embodiments, blockchain API host 104 may verify the signature and prepare a proposal to register customer 109 (Step 206). Blockchain API host 104 may verify the signature by performing a crypto operation using the public key to the data that was signed using the private key. Blockchain API host 104 may propagate the registration proposal to consensus participants 103 (Step 207). Blockchain API host 104 may propagate the registration proposal by writing it to the blockchain or by otherwise transmitting the proposal to consensus participants 103. Consensus participants 103 may achieve consensus and add a new ledger for customer 109 to blockchain 102 (Step 208). Consensus participants 103 may validate registrations, loyalty point transactions, and any other activity on blockchain 102 by establishing consensus between the participants based on proof of work, proof of stake, practical byzantine fault tolerance, delegated proof of stake, or other suitable consensus algorithms. Consensus participants 103 may notify loyalty wallet 105 of successful registration by transmitting a confirmation, or by loyalty wallet locating the registration written on blockchain 102 (Step 209).

Figure 3:
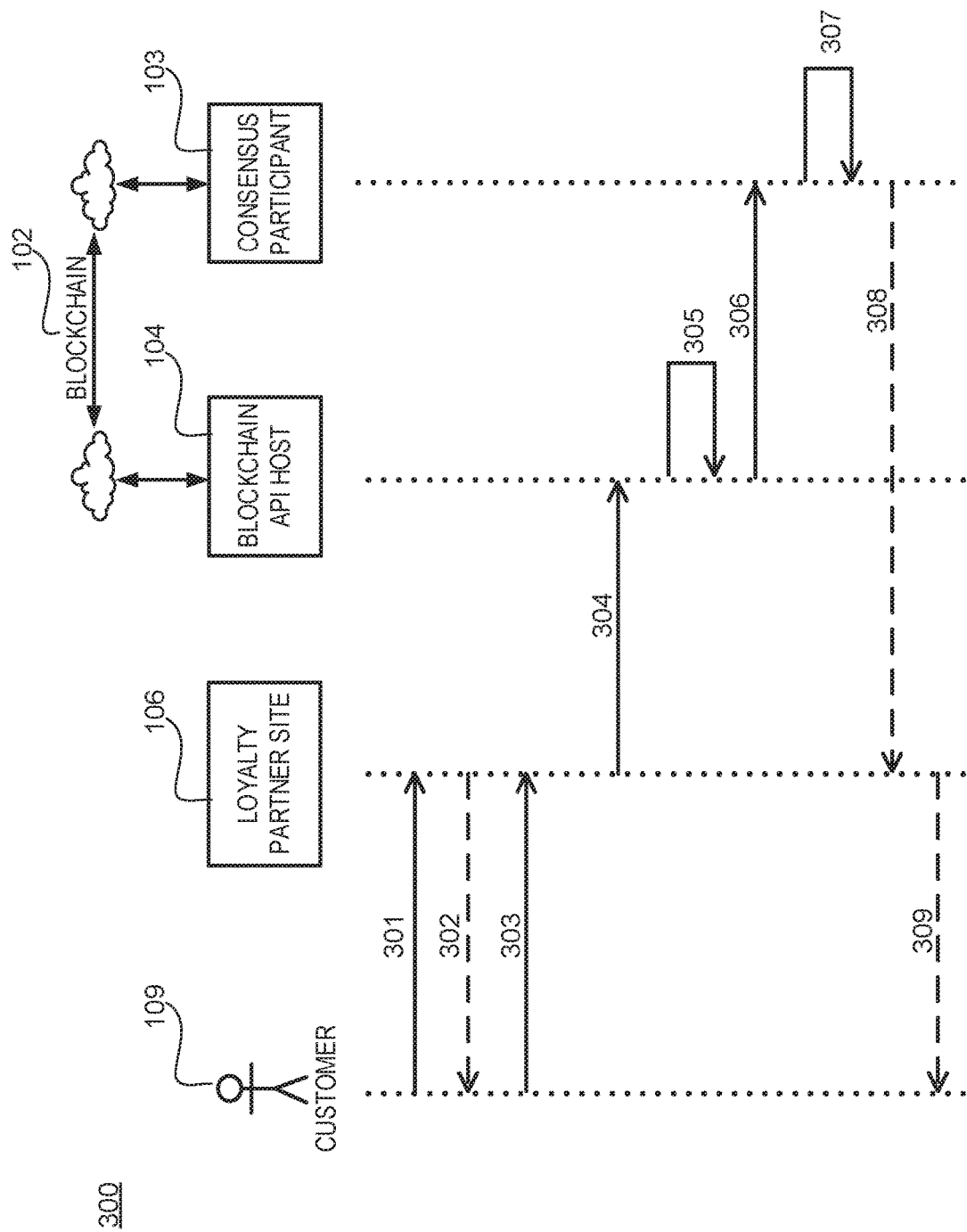
FIG. 3 illustrates a process for shopping for loyalty point purchases on a website hosted by a merchant that accepts loyalty points as payment, in accordance with various embodiments.

With reference to FIG. 3, process 300 is shown for shopping for on loyalty point network 100, in accordance with various embodiments. Customer 109 shops with a loyalty partner by browsing loyalty partner site 106 (Step 301). Loyalty partner site 106 may prompt customer 109 and/or loyalty wallet 105 for the corresponding loyalty account at checkout (Step 302). The loyalty account may be identifiable by a universally unique identifier (UUID), for example. Customer 109 may provide the loyalty account (Step 303) in response to the prompt by entering the loyalty account and/or by loyalty wallet 105 transmitting the loyalty account.

In various embodiments, Loyalty partner site 106 may transmit a point adjustment request to blockchain API host 104 (Step 304) using an API call. Blockchain API host 104 may execute a smart contract (Step 305) in response to receiving the API request to adjust a point balance. Blockchain API host 104 may also send adjustment request to the network of consensus participants 103 (Step 306). Consensus participants 103 may achieve consensus and thus new entry to blockchain 102 (Step 307). Consensus participants 103 may notify loyalty partner site 106 (Step 308) of the completed balance adjustment. Consensus participants 103 may also notify customer 109 (Step 309) of the completed balance adjustment.

Figure 4:
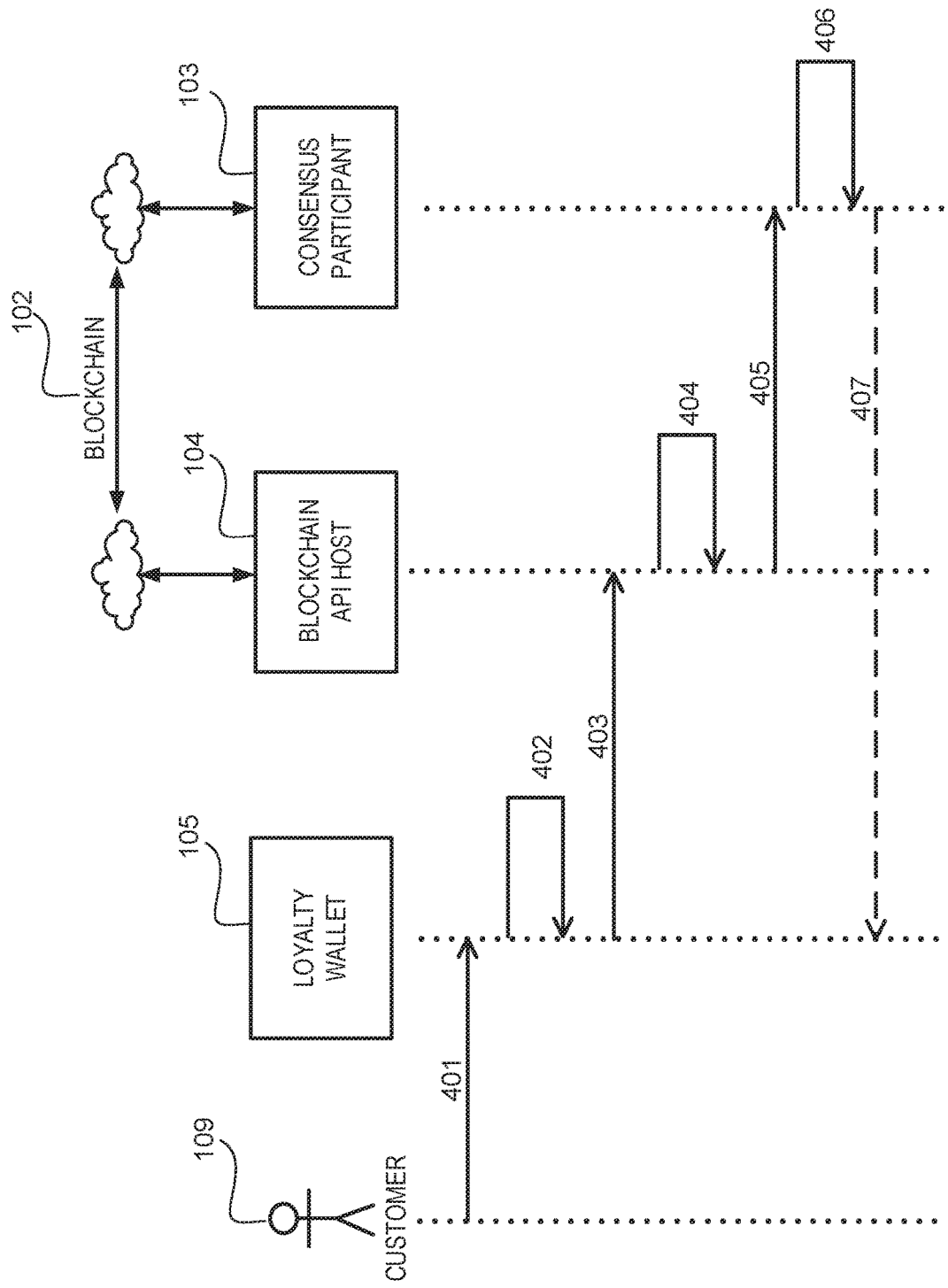
FIG. 4 illustrates a process for checking a loyalty point balance on a blockchain-based leger, in accordance with various embodiments.

With reference to FIG. 4, a process 400 is shown for checking a loyalty point balance in loyalty point network 100, in accordance with various embodiments. Customer 109 request his or her loyalty point balance in loyalty wallet 105 (Step 401). Loyalty wallet 105 may prepare and/or sign the request (Step 402). Loyalty wallet 105 may sign the request by performing a crypto operation with a private key from an asymmetric cryptographic key pair as described above. Loyalty wallet 105 may transmit the signed request to blockchain API host 104 (Step 403).

In various embodiments, blockchain API host 104 may validate the signature and prepare a proposal to inquire point balance (Step 404). Blockchain API host 104 may validate the signature by performing a cryptographic operation using the public key on the data what was encrypted by loyalty wallet 105 using the corresponding private key. Blockchain API host 104 may prepare the proposal by preparing data for writing to a block of the blockchain including, for example, an identifier of the customer (e.g., the public key or blockchain address), the transaction (e.g., a balance inquiry), the requesting party, a timestamp, or any other data for inclusion in the blockchain.

In various embodiments, blockchain API host 104 may propagate the proposal to consensus participants 103 by transmitting the proposal and/or writing the proposal to blockchain 102 (Step 405). Consensus participants 103 may achieve consensus and add the proposal to the blockchain 102 (Step 406). The consensus participants 103 and/or blockchain API host 104 may notify customer 109 by writing to blockchain 102 and/or transmitting a confirmation and/or a balance to loyalty wallet 105 (Step 407).

Figure 5:
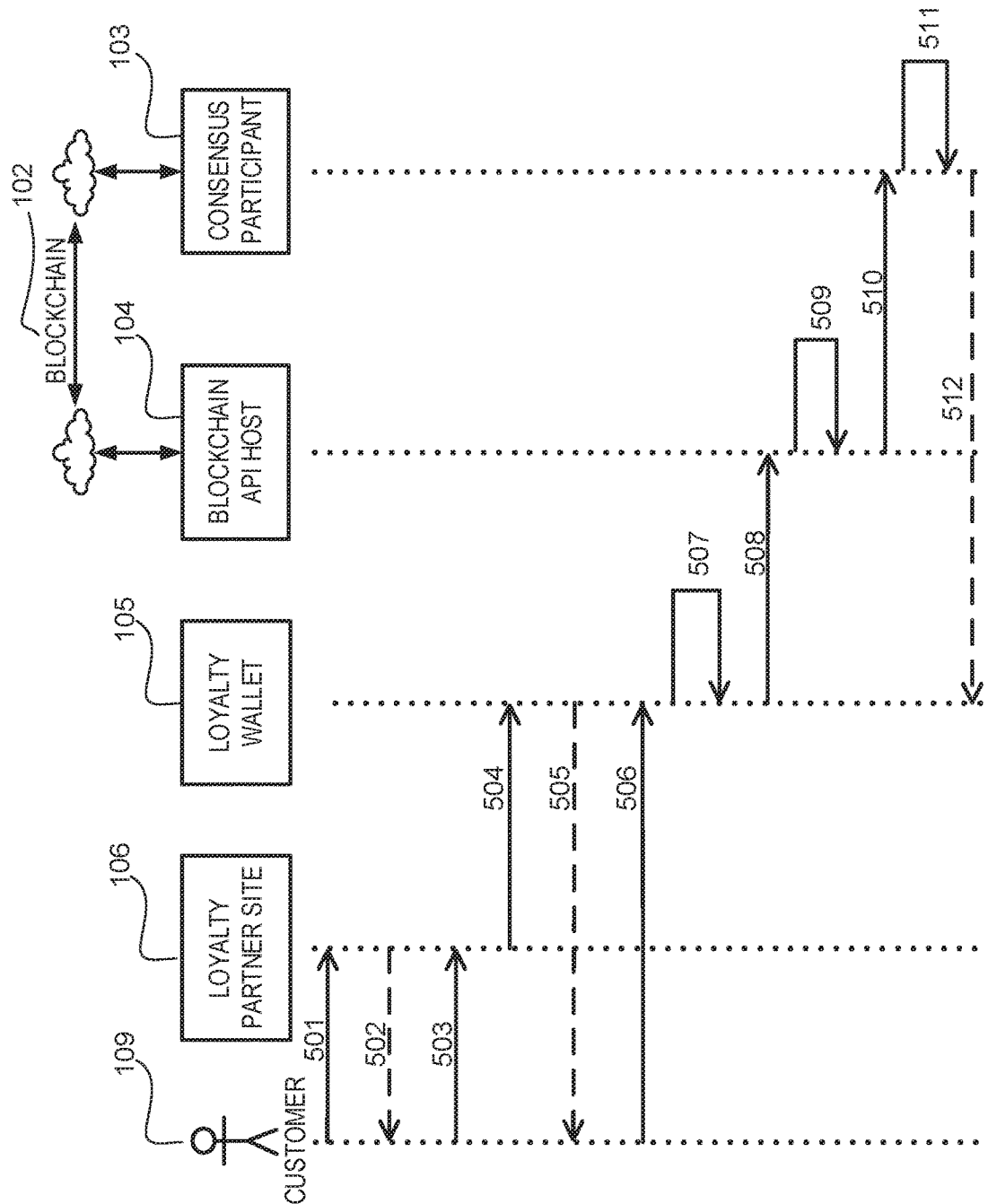
FIG. 5 illustrates a process for a user to spend their loyalty points, in accordance with various embodiments.

Referring now to FIG. 5, a process 500 is shown for spending loyalty points with a loyalty partner site 106 of loyalty point network 100, in accordance with various embodiments. Customer 109 may shop on a loyalty partner site 106 using a website or native application (Step 501). Loyalty partner site 106 may host a checkout page (Step 502). The checkout page may offer various payment methods such as credit, ACH, gift cards, and loyalty points, for example. Customer 109 may select loyalty points as a payment method on loyalty partner site 106 (Step 503).

In response to the selection of loyalty points as a payment method, a computing device may open loyalty wallet 105 installed on the computing device by a deep link (Step 504). A deep link allows a first application running on a computing device to launch a second application installed on the computing device and/or pass data from the first application to the second application. For example, web browsers running on mobile devices often launch an application store to facilitate installation of a particular application on the mobile device. Here, the deep link triggered by selecting points as a payment method may launch loyalty wallet 105 and send as parameters the merchant blockchain account (e.g., the merchant's public key) and the amount of purchase.

In various embodiments, the computing device may prompt for a security password to access loyalty wallet 105 (Step 505), and the computing device may receive and/or authenticate the password from customer 109 (Step 506). The password may be in the form of a pin, passcode, password, biometric identifier, one-time password, or other data suitable for authenticating customer 109. Loyalty wallet 105 may decrypt the private key stored on the computing device and sign a request to pay loyalty partner site 106 using loyalty points (Step 507). The request may include the data passed to loyalty wallet 105 by the deep link in response to loyalty partner site 106 launching loyalty wallet 105. For example, the request may include the merchant's blockchain address and the amount of purchase.

In various embodiments, loyalty wallet 105 may send the payment request to blockchain API host 104 (Step 508). Blockchain API host 104 may validate the signature in response to receiving the request by performing a cryptographic operation using the public key on the data that was encrypted by loyalty wallet 105 using the corresponding private key. Blockchain API host 104 may prepare the proposal by preparing data for writing to a block of the blockchain including, for example, the customer's blockchain address (e.g., the public key), the transaction (e.g., a payment), a transaction amount, the merchant's blockchain address, a timestamp, or any other data for inclusion in the blockchain.

In various embodiments, blockchain API host 104 may propagate the proposal to consensus participants 103 by transmitting the proposal and/or writing the proposal to blockchain 102 (Step 510). Consensus participants 103 may achieve consensus and add the proposal to the blockchain 102 (Step 511). The consensus participants 103 and/or blockchain API host 104 may thus notify customer 109 by writing data from the proposal to blockchain 102 and/or transmitting a confirmation to loyalty wallet 105 (Step 512). Once written to the blockchain, the data from the proposal updates the account balance for customer 109 by removing the amount of loyalty points spent with loyalty partner site 106.

Figure 6:
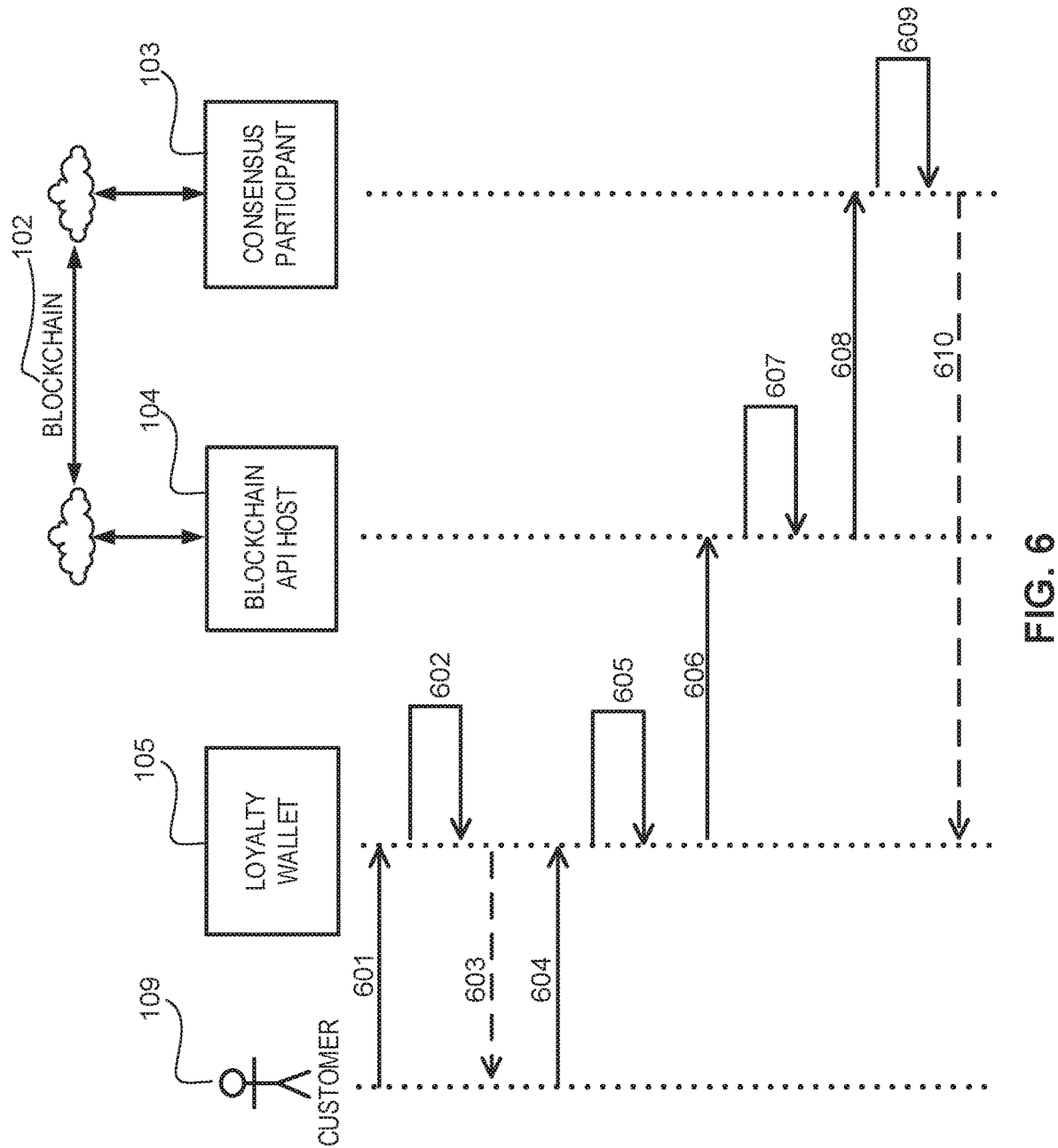
FIG. 6 illustrates a process for peer-to-peer loyalty point transfer using a blockchain-based leger, in accordance with various embodiments.

With reference to FIG. 6, a process 600 is shown for peer-to-peer transfer of loyalty points in loyalty point network 100, in accordance with various embodiments. Customer 109 may request a peers' account (Step 601). The account may be sent to the customer via a message or email, for example, and may come in the form of the peer's public key, UUID, and/or blockchain address. Loyalty wallet 105 may fetch the peer's address (Step 602). For example, loyalty wallet 105 may scan a communication channel to identify the account, may allow customer 109 to enter the account, or may communicate with a loyalty wallet belonging to the peer to receive the account.

In various embodiments, loyalty wallet 105 running on the customer's computing device may prompt customer 109 for a security password (Step 603), and the computing device may receive and/or authenticate the password from customer 109 (Step 604). The password may be in the form of a pin, passcode, password, biometric identifier, one-time password, or other data suitable for authenticating customer 109. Loyalty wallet 105 may decrypt the private key stored on the computing device and sign a request to transfer loyalty points to the peer's account (Step 605). The request may include, for example, the peer's account and the amount of points for transfer to the peer.

In various embodiments, loyalty wallet 105 may send the transfer request to blockchain API host 104 (Step 606). Blockchain API host 104 may validate the signature and prepare a proposal in response to receiving the request (Step 607). Blockchain API host 104 may validate the signature by performing a cryptographic operation using the public key on the data that was encrypted by loyalty wallet 105 using the corresponding private key. Blockchain API host 104 may also prepare a transfer proposal by preparing data for writing to a block of the blockchain with the data including, for example, the customer's blockchain address (e.g., the public key), the transaction (e.g., a transfer), the peer's account (e.g., blockchain address), a timestamp, the transfer amount, or any other data for inclusion in the blockchain.

In various embodiments, blockchain API host 104 may propagate the proposal to consensus participants 103 by transmitting the proposal and/or writing the proposal to blockchain 102 (Step 608). Consensus participants 103 may achieve consensus and add the proposal to the blockchain 102 (Step 609). The consensus participants 103 and/or blockchain API host 104 may thus notify customer 109 by writing data from the proposal to blockchain 102 and/or transmitting a confirmation to loyalty wallet 105 (Step 610). Once written to the blockchain, the data from the proposal updates the account balances for customer 109 and the peer by transferring the requested amount of loyalty points from the customer's account to the peer's account.

Figure 7:
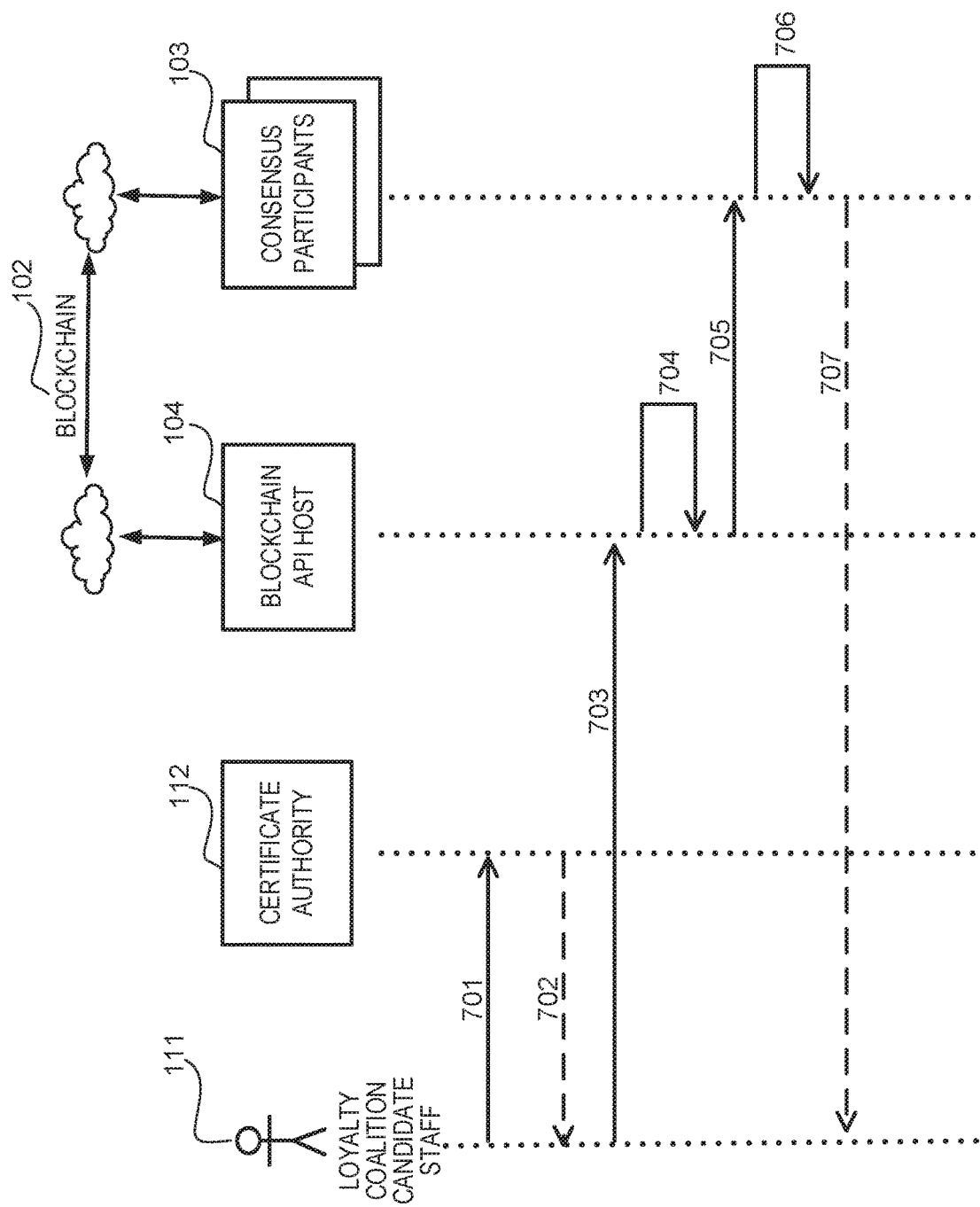
FIG. 7 illustrates a process for adding a loyalty coalition member to a blockchain-based loyalty point system, in accordance with various embodiments.

With reference to FIG. 7, process 700 is shown for adding a loyalty coalition member such as a new loyalty partner, in accordance with various embodiments. The candidate staff 111 may register an entity with certificate authority 112 (Step 701). Certificate authority 112 may respond by providing certificates and/or private keys to the loyalty coalition candidate staff 111 (Step 702). Loyalty coalition candidate staff may prepare a request to add the entity as a new coalition member, sign the request, and transmit the request to blockchain API host 104 (Step 703). The request may be signed by performing a cryptographic operation on all or part of the request using the private key received from the certificate authority 112.

In various embodiments, blockchain API host 104 may verify the signature by performing a cryptographic operation on the signed data using the public key corresponding to the entity's private key (Step 704). Blockchain API host 104 may also prepare a proposal to add the entity to loyalty point network 100. Blockchain API host 104 may propagate the proposal to consensus participants 103 by transmitting the proposal and/or writing the proposal to blockchain 102 (Step 705). Consensus participants 103 may achieve consensus and add the proposal to the blockchain 102 (Step 706). The consensus participants 103 and/or blockchain API host 104 may thus notify loyalty coalition candidate staff 111 by writing data from the proposal to blockchain 102 and/or transmitting a confirmation to loyalty wallet 105 (Step 707). Once written to the blockchain, the data from the proposal adds the entity to the loyalty payment network of network 100.

Figure 8:
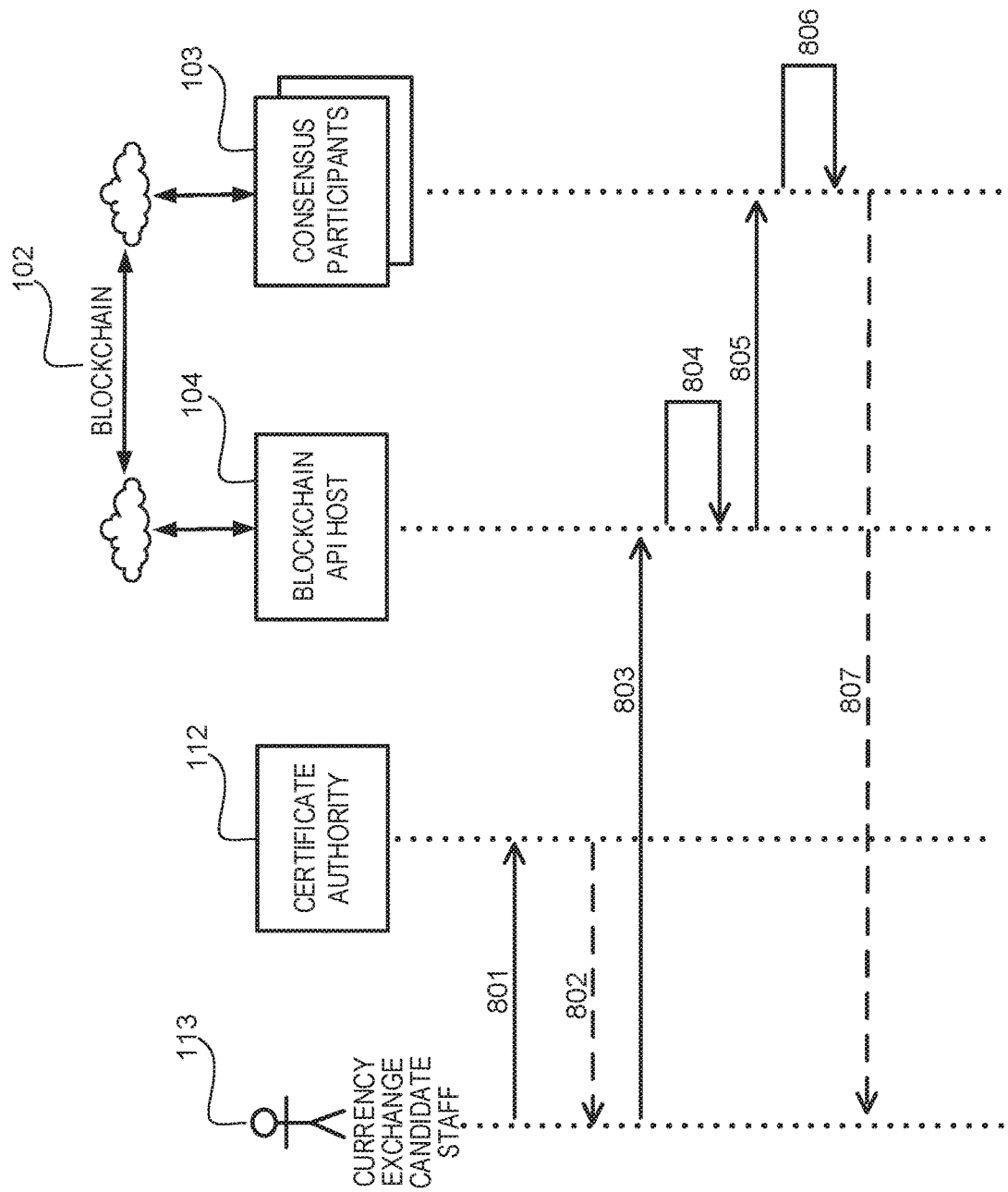
FIG. 8 illustrates a process for adding a currency exchange to a blockchain-based loyalty point system, in accordance with various embodiments.

With reference to FIG. 8, a process 800 for adding a currency exchange to loyalty payment network 100 is shown, in accordance with various embodiments. The candidate staff 113 working on behalf of the registering entity may register an entity with certificate authority 112 (Step 801). Certificate authority 112 may respond by providing certificates and/or private keys to the currency exchange candidate staff 113 (Step 802). Currency exchange candidate staff 113 may prepare a request to add the entity as a currency exchange, sign the request, and transmit the request to blockchain API host 104 (Step 803). The request may be signed by performing a cryptographic operation on all or part of the request using the private key received from the certificate authority 112.

In various embodiments, blockchain API host 104 may verify the signature by performing a cryptographic operation on the signed data using the public key corresponding to the entity's private key (Step 804). Blockchain API host 104 may also prepare a proposal to add the entity to loyalty point network 100 as a currency exchange. Blockchain API host 104 may propagate the proposal to consensus participants 103 by transmitting the proposal and/or writing the proposal to blockchain 102 (Step 805). Consensus participants 103 may achieve consensus and add the proposal to the blockchain 102 (Step 806). The consensus participants 103 and/or blockchain API host 104 may thus notify currency exchange candidate staff 113 by writing data from the proposal to blockchain 102 and/or transmitting a confirmation to loyalty wallet 105 (Step 807). Once written to the blockchain, the data from the proposal adds the entity to the loyalty payment network of network 100 as a currency exchange.

Figure 9:
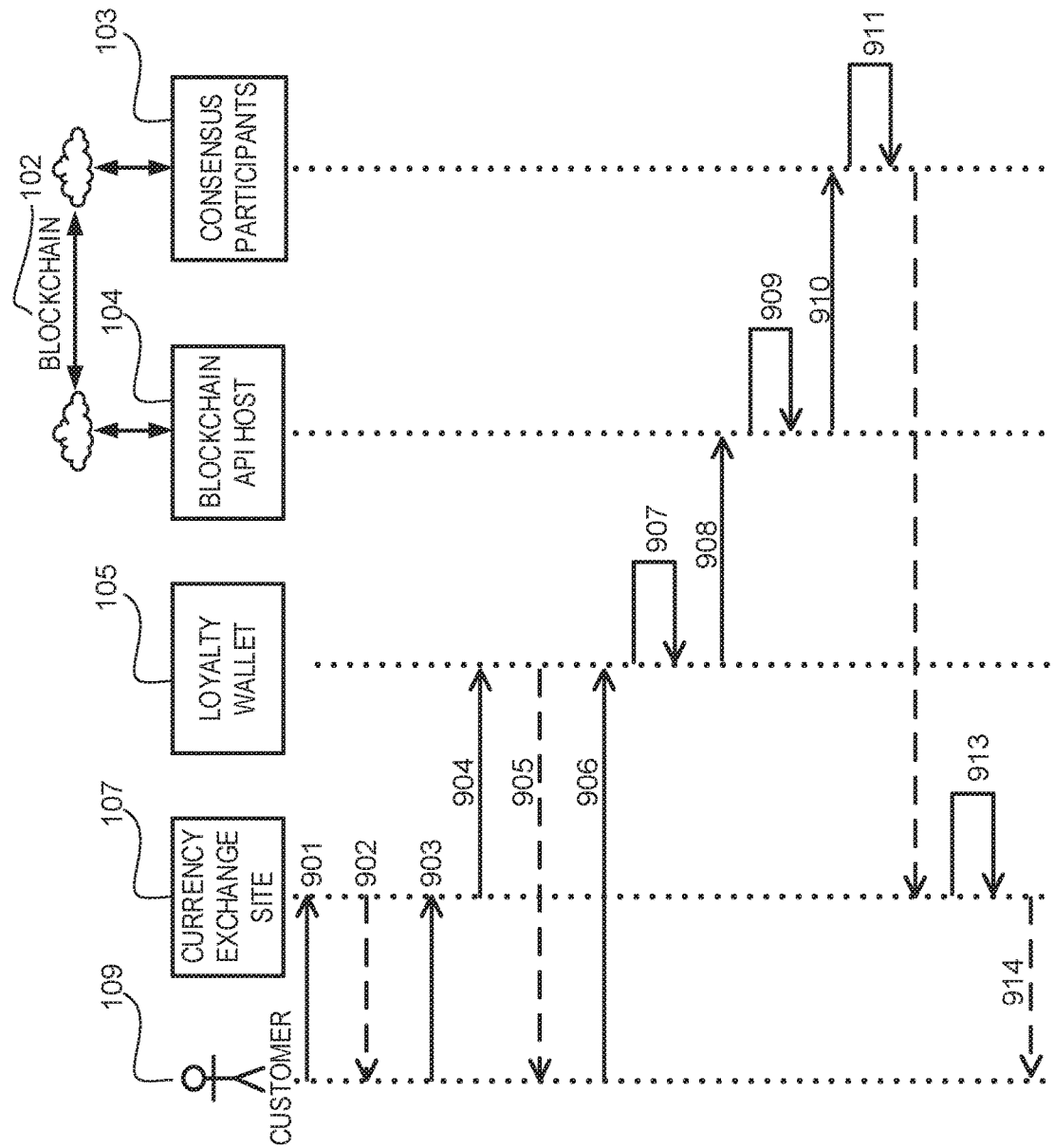
FIG. 9 illustrates an exemplary process for exchanging loyalty points for fiat currency, in accordance with various embodiments.

Referring now to FIG. 9, a process 900 is shown for exchanging loyalty points for fiat currency in loyalty payment network 100, in accordance with various embodiments. Customer 109 accesses on a currency exchange site 107 using a website or native application to request a currency exchange rate (Step 901). Currency exchange site 107 may provide exchange rates from loyalty points into one or more fiat currencies and/or from fiat currencies into loyalty points (Step 902). Customer 109 may provide to currency exchange site 107 exchange information in requesting the currency exchange (Step 903). The exchange information may include destination account for the fiat currency, ACH details, currency type, currency amount, or other data.

In response to the request for a currency exchange, a computing device may open loyalty wallet 105 installed on the computing device by a deep link (Step 904). The deep link triggered by requesting a currency exchange from points to fiat currency may launch loyalty wallet 105 and send as parameters the requested fiat currency type, the requested fiat currency amount, the amount of loyalty points to exchange, and/or the account of the currency exchange (e.g., the exchange's public key, UUID).

In various embodiments, the computing device may prompt for a security password to access loyalty wallet 105 (Step 905), and the computing device may receive and/or authenticate the password from customer 109 (Step 906). The password may be in the form of a pin, passcode, password, biometric identifier, one-time password, or other data suitable for authenticating customer 109. Loyalty wallet 105 may decrypt the private key stored on the computing device and sign a request to exchange currency with currency exchange site 107 (Step 907). The request may include the data passed to loyalty wallet 105 by the deep link in response to currency exchange site 107 launching loyalty wallet 105. For example, the request may include the exchange's account, the amount of loyalty points to exchange, and the fiat currency type.

In various embodiments, loyalty wallet 105 may send the exchange request to blockchain API host 104 (Step 908). Blockchain API host 104 may validate the signature in response to receiving the request by performing a cryptographic operation using the public key on the data that was encrypted by loyalty wallet 105 using the corresponding private key (Step 909). Blockchain API host 104 may prepare the proposal by preparing data for writing to a block of the blockchain including, for example, the customer's blockchain address (e.g., the public key), the transaction (e.g., a currency exchange), an exchange amount, the merchant's blockchain address, a timestamp, or any other data for inclusion in the blockchain.

In various embodiments, blockchain API host 104 may propagate the proposal to consensus participants 103 by transmitting the proposal and/or writing the proposal to blockchain 102 (Step 910). Consensus participants 103 may achieve consensus and add the proposal to the blockchain 102 (Step 911). The consensus participants 103 and/or blockchain API host 104 may thus notify the currency exchange by writing data from the proposal to blockchain 102 and/or transmitting a confirmation to currency exchange site 107 (Step 912). Once written to the blockchain, the data from the proposal updates the account balance for customer 109 by removing the amount of loyalty points exchanged with currency exchange site 107. The currency exchange may credit the bank account identified to currency exchange site 107 with the fiat currency amount (Step 913). The currency exchange may use an ACH transfer to credit customer 109 with the account and transfer information entered by customer 109 (in Step 903). Currency exchange site 107 may notify loyalty wallet 105 in response to completion of the exchange (Step 914). The notification may take the form of a text message, email, or push notification, for example.

The processes described herein improve the functioning of the computer by propagating loyalty point data quickly and immutably. For example, by the user may simply request a transaction using stored blockchain keys and account numbers as opposed to manually inputting data, the user performs less computer functions and provides less input, which saves on data storage and memory which speeds processing. Additionally, by transmitting, storing, and accessing data using the processes described herein, the security of the data is improved, which decreases the risk of the computer or network from being compromised. Use of blockchain 108 ensures integrity and immutability of communications in such way that neither of the interacting parties have to rely on a specific entity to maintain the state of the ledger. The use of blockchain 108 may also enable full transparency. Since all participants in effect maintain a single ledger, consistency may be maintained between various blockchain nodes. The complexity of system 100 is also reduced by alleviating the use of offline and/or batch processes typically used to keep multiple systems in sync.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

As used herein, "transmit" may include sending electronic data from one system component to another over a network connection. Additionally, as used herein, "data" may include encompassing information such as commands, queries, files, data for storage, and the like in digital or any other form.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"), which may also be referred to as a universally unique identifier ("UUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain. For more information on blockchain-based payment networks, see U.S. application Ser. No. 15/266,350 titled SYSTEMS AND METHODS FOR BLOCKCHAIN BASED PAYMENT NETWORKS and filed on Sep. 15, 2016, the contents of which is incorporated by reference here in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

It will be understood that each functional block of the block diagrams and the flowchart illustrations, and combinations of functional blocks in the block diagrams and flowchart illustrations, respectively, can be implemented by computer program instructions. The process flows depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

The disclosure and claims do not describe only a particular outcome of operating a loyalty point network, but the disclosure and claims include specific rules for implementing the outcome of operating a loyalty point network and that render information into a specific format that is then used and applied to create the desired results of operating a loyalty point network, as set forth in *McRO, Inc.* v. *Bandai Namco Games America Inc.* (Fed. Cir. case number 15-1080, Sep. 13, 2016). In other words, the outcome of operating a loyalty point network can be performed by many different types of rules and combinations of rules, and this disclosure includes various embodiments with specific rules. While the absence of complete preemption may not guarantee that a claim is eligible, the disclosure does not sufficiently preempt the field of operating a loyalty point network at all. The disclosure acts to narrow, confine, and otherwise tie down the disclosure so as not to cover the general abstract idea of just operating a loyalty point network. Significantly, other systems and methods exist for operating a loyalty point network, so it would be inappropriate to assert that the claimed invention preempts the field or monopolizes the basic tools of operating a loyalty point network. In other words, the disclosure will not prevent others from operating a loyalty point network, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does

What is claimed is:

1. A method, comprising:
receiving, by a host computing device that provides a blockchain application programming interface (API), a registration request from a loyalty wallet executed on a client device for access to a loyalty point network, wherein the registration request comprises a public key generated by the loyalty wallet of the client device and a signature signed by the loyalty wallet, the public key is associated with a first customer account, wherein the loyalty point network restricts access to a blockchain network for a plurality of authorized devices and a plurality of loyalty partner websites;
validating, by the host computing device, the signature of the registration request for access to the loyalty point network in response to receiving the registration request from the loyalty wallet, the validation comprises performing a cryptographic operation on the registration request using the public key;
generating, by the host computing device, a registration proposal for the loyalty wallet executed on the client device;
writing, by the host computing device, the registration proposal to the blockchain network, wherein the blockchain network comprises a plurality of consensus participant devices that maintain a distributed database, and the client device is authorized to access the loyalty point network in response to the registration proposal being written to the blockchain network;
receiving, by the host computing device, a request to transfer an amount of loyalty points from the first customer account associated with the client device to a second customer account in the loyalty point network, wherein the request to transfer comprises the signature signed by the loyalty wallet;
validating, by the host computing device, the signature of the request to transfer by performing the cryptographic operation on the request to transfer using the public key associated with the first customer account;
writing, by the host computing device, a proposal to the blockchain network, wherein the proposal comprises a first blockchain address for the first customer account in which the first blockchain address corresponds to the public key, a second blockchain address for the second customer account, and the amount of loyalty points, wherein writing the proposal to the blockchain network updates an account balance of the first customer account in the loyalty point network;
receiving, by the host computing device, a point adjustment request from a loyalty partner website of the plurality of loyalty partner websites authorized for the loyalty point network, the point adjustment request comprising the first customer account for the client device; and
executing, by the host computing device, a smart contract of the blockchain network to adjust the account balance of the first customer account based at least in part on the point adjustment request from the loyalty partner website.

2. The method of claim 1, wherein the loyalty wallet transmits the registration request using an API call.

3. The method of claim 1, wherein the plurality of consensus participant devices achieve consensus on the proposal using at least one of proof of work, proof of stake, practical byzantine fault tolerance, or delegated proof of stake.

4. The method of claim 1, wherein the loyalty wallet encrypts and stores a private key corresponding to the public key.

5. The method of claim 1, wherein the registration request comprises a first registration request, the public key comprises a first public key, and further comprising:
receiving, by the host computing device, a second registration request for a loyalty partner site;
validating, by the host computing device, the second registration request by performing the cryptographic operation on at least a portion of the registration request using a second public key associated with the loyalty partner site; and
transmitting, by the host computing device, a second registration proposal to the plurality of consensus participant devices for writing to the blockchain network.

6. The method of claim 5, further comprising:
receiving, by the host computing device, a payment request from the loyalty wallet associated with the second customer account, wherein the payment request comprises a merchant account and a payment amount;
validating, by the host computing device, the payment request by performing the cryptographic operation on at least a portion of the payment request using a third public key associated with the second customer account; and
transmitting, by the host computing device, a payment proposal to the plurality of consensus participant devices for writing to the blockchain network, wherein the payment proposal includes the merchant account, the payment amount, and the second customer account.

7. The method of claim 1, wherein the public key comprises a first public key, and further comprising:
receiving, by the host computing device, an exchange request from the loyalty wallet associated with the second customer account, wherein the exchange request comprises a currency exchange account, a fiat currency type, an exchange rate, and a loyalty point amount;
validating, by the host computing device, the exchange request by performing the cryptographic operation on at least a portion of the exchange request using a second public key associated with the second customer account; and
transmitting, by the host computing device, an exchange proposal to the plurality of consensus participant devices for writing to the blockchain network, wherein the exchange proposal includes the currency exchange account, the fiat currency type, the exchange rate, and the loyalty point amount.

8. The method of claim 1, further comprising:
transmitting, by the host computing device, a registration confirmation to the loyalty wallet on the client device in response to writing the registration proposal to the blockchain network.

9. A loyalty point network, comprising:
a processor;
a tangible, non-transitory memory configured to communicate with the processor, the tangible, non-transitory memory having instructions stored thereon that, in response to execution by the processor, cause a host computing device to perform operations comprising:
receiving, by the host computing device that provides a blockchain application programming interface (API), a registration request from a loyalty wallet executed on a client device for access to the loyalty point network, wherein the registration request comprises a public key generated by the loyalty wallet of the client device and a signature signed by the loyalty wallet, the public key is associated with a first customer account, wherein the loyalty point network restricts access to a blockchain network for a plurality of authorized devices and a plurality of loyalty partner websites;

validating, by the host computing device, the signature of the registration request for access to the loyalty point network in response to receiving the registration request from the loyalty wallet, the validation comprises performing a cryptographic operation on the registration request using the public key;

generating, by the host computing device, a registration proposal for the loyalty wallet executed on the client device;

writing, by the host computing device, the registration proposal to the blockchain network, wherein the blockchain network comprises a plurality of consensus participant devices that maintain a distributed database, and the client device is authorized to access the loyalty point network in response to the registration proposal being written to the blockchain network;

receiving, by the host computing device, a request to transfer an amount of loyalty points from the first customer account associated with the client device to a second customer account in the loyalty point network, wherein the request to transfer comprises the signature signed by the loyalty wallet;

validating, by the host computing device, the signature of the request by performing the cryptographic operation on the request using the public key associated with the first customer account;

writing, by the host computing device, a proposal to the blockchain network, wherein the proposal comprises a first blockchain address for the first customer account in which the first blockchain address corresponds to the public key, a second blockchain address for the second customer account, and the amount of loyalty points, wherein writing the proposal to the blockchain network updates an account balance of the first customer account in the loyalty point network;

receiving, by the host computing device, a point adjustment request from a loyalty partner website of the plurality of loyalty partner websites authorized for the loyalty point network, the point adjustment request comprising the first customer account for the client device; and executing, by the host computing device, a smart contract of the blockchain network to adjust the account balance of the first customer account based at least in part on the point adjustment request from the loyalty partner website.

10. The loyalty point network of claim 9, wherein the client device transmits the request to transfer using an API call.

11. The loyalty point network of claim 9, wherein the plurality of consensus participant devices achieve consensus on the proposal using at least one of a proof of work, a proof of stake, a practical byzantine fault tolerance, or a delegated proof of stake.

12. The loyalty point network of claim 9, wherein the loyalty wallet encrypts and stores a private key corresponding to the public key.

13. The loyalty point network of claim 9, wherein the registration request comprises a first registration request, the public key comprises a first public key, and further comprising:
receiving, by the host computing device, a second registration request for a loyalty partner site;
validating, by the host computing device, the second registration request by performing the cryptographic operation on at least a portion of the registration request using a second public key associated with the loyalty partner site; and
transmitting, by the host computing device, a second registration proposal to the plurality of consensus participant devices for writing to the blockchain network.

14. The loyalty point network of claim 13, further comprising:
receiving, by the host computing device, a payment request from a loyalty wallet associated with the second customer account, wherein the payment request comprises a merchant account and a payment amount;
validating, by the host computing device, the payment request by performing the cryptographic operation on at least a portion of the payment request using a third public key associated with the second customer account; and
transmitting, by the host computing device, a payment proposal to the plurality of consensus participant devices for writing to the blockchain network, wherein the payment proposal includes the merchant account, the payment amount, and the second customer account.

15. The loyalty point network of claim 9, wherein the public key comprises a first public key, and further comprising:
receiving, by the host computing device, an exchange request from a loyalty wallet associated with the second customer account, wherein the exchange request comprises a currency exchange account, a fiat currency type, an exchange rate, and a loyalty point amount;
validating, by the host computing device, the exchange request by performing the cryptographic operation on at least a portion of the exchange request using a public key associated with the second customer account; and
transmitting, by the host computing device, an exchange proposal to the plurality of consensus participant devices for writing to the blockchain network, wherein the exchange proposal includes the currency exchange account, the fiat currency type, the exchange rate, and the loyalty point amount.

16. The loyalty point network of claim 9, further comprising:
transmitting, by the host computing device, a registration confirmation to the loyalty wallet on the client device in response to writing the registration proposal to the blockchain network.

17. An article of manufacture including a non-transitory, tangible computer readable storage medium having instructions stored thereon that, in response to execution by a host computing device, cause the host computing device to perform operations comprising:
receiving, by the host computing device that provides a blockchain application programming interface (API), a registration request from a loyalty wallet executed on a client device for access to a loyalty point network, wherein the registration request comprises a public key generated by the loyalty wallet of the client device and a signature signed by the loyalty wallet, the public key is associated with a first customer account, wherein the loyalty point network restricts access to a blockchain network for a plurality of authorized devices and a plurality of loyalty partner websites;

validating, by the host computing device, the signature of the registration request for access to the loyalty point network in response to receiving the registration request from the loyalty wallet, the validation comprises performing a cryptographic operation on the registration request using the public key;

generating, by the host computing device, a registration proposal for the loyalty wallet executed on the client device;

writing, by the host computing device, the registration proposal to a first block in the blockchain network, wherein the blockchain network comprises a plurality of consensus participant devices that maintain a distributed database, and the client device is authorized to access the loyalty point network in response to the registration proposal being written to the blockchain network;

receiving, by the host computing device, a request to transfer an amount of loyalty points from the first customer account associated with the client device to a second customer account in the loyalty point network, wherein the request to transfer comprises the signature signed by the loyalty wallet;

validating, by the host computing device, the signature of the request by performing the cryptographic operation on the request using the public key associated with the first customer account;

writing, by the host computing device, a proposal to the blockchain network, wherein the proposal comprises a first blockchain address for the first customer account, a second blockchain address for the second customer account, and the amount of loyalty points, wherein writing the proposal to the blockchain network updates an account balance of the first customer account in the loyalty point network;

receiving, by the host computing device, a point adjustment request from a loyalty partner website of the plurality of loyalty partner websites authorized for the loyalty point network, the point adjustment request comprising the first customer account for the client device; and executing, by the host computing device, a smart contract of the blockchain network to adjust the account balance of the first customer account based at least in part on the point adjustment request from the loyalty partner website.

18. The article of claim 17, wherein the plurality of consensus participant devices achieve consensus on the proposal using at least one of a proof of work, a proof of stake, a practical byzantine fault tolerance, or a delegated proof of stake.

19. The article of claim 17, wherein the public key comprises a first public key, and the operations further comprise:

receiving, by the host computing device, a payment request from a loyalty wallet associated with the second customer account, wherein the payment request comprises a merchant account and a payment amount;

validating, by the host computing device, the payment request by performing the cryptographic operation on at least a portion of the payment request using a second public key associated with the second customer account; and transmitting, by the host computing device, a payment proposal to the plurality of consensus participant devices for writing to the blockchain network, wherein the payment proposal includes the merchant account, the payment amount, and the second customer account.

20. The article of claim 17, wherein the instructions, in response to execution by the host computing device, cause the host computing device to perform operations comprising:

generating, by the host computing device, the proposal based at least in part on the first blockchain address for the first customer account in which the first blockchain address corresponds to the public key, the second blockchain address for the second customer account, and the amount of loyalty points, the proposal is generated in response to the validation of the request to transfer the amount of loyalty points.

* * * * *